July 14, 1942.         T. T. NEILL           2,289,379
                         INDICATOR
                       Filed May 2, 1941
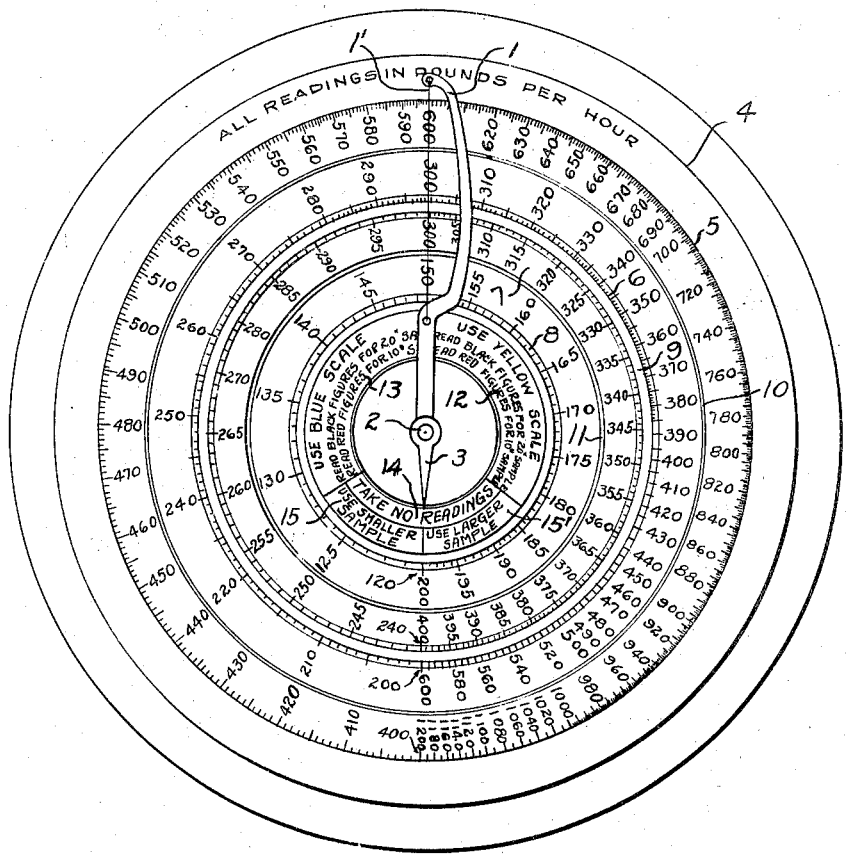
INVENTOR
THOMAS T. NEILL
BY
ATTORNEYS Patented July 14, 1942

2,289,379

UNITED STATES PATENT OFFICE 2,289,379

INDICATOR

Thomas T. Neill, Dayton, Ohio

Application May 2, 1941, Serial No. 391,577

1 Claim. (Cl. 116—129)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an indicator and more particularly to an indicator which may be used for determining the rate of fuel consumption of an internal combustion engine.

In determining the fuel consumption of internal combustion engines, it is customary to measure the length of time required for the engine to consume a given weight of fuel. For instance, it may be found that one engine consumes ten pounds of gasoline in 72 seconds while another engine consumes the same amount of gasoline in 75 seconds. Had a different sized sample of fuel been used, for instance, twenty pounds, then the time required for the engines to consume this amount of fuel would be just twice as long, or 144 seconds in the case of the first engine and 150 seconds in the case of the second engine.

In order to reduce these results to a common basis for easy comparison regardless of the size of the sample used during the test, it is customary to convert the results of the various tests into pounds of fuel consumed per hour. Thus, in the case considered above, the first engine was consuming fuel at the rate of 500 pounds per hour while the second engine was consuming it at the rate of 480 pounds per hour. Heretofore this reduction has been accomplished by means of time charts made up for the different sized samples. More specifically, for each size of sample there is listed a column of seconds of time and an adjacent column of pounds per hour so that the laboratory assistant can run his finger down the seconds column until he comes to the number of seconds required for the test and then by moving his finger across into the pounds per hour column, he can read the converted result in pounds per hour. This is a slow and laborious procedure, however, which involves interpolation of the tables for an exact determination of the converted figure. The preparation of the tables is likewise a lengthy and tedious task involving a great number of calculations and a correspondingly great possibility of error.

In order to eliminate all of these undesirable and time-consuming operations, I have devised a simple and inexpensive contrivance which furnishes the results of the tests directly in pounds of fuel consumed per hour.

Accordingly, the primary object of my invention is to provide an indicator which may be used for determining the fuel consumption of internal combustion engines.

Another object of my invention is to provide a "stop" clock with a suitable dial for converting the clock into a rate of flow determining device.

A further object of my invention is to provide a rotary indicator with a single scale divided up into a plurality of circular sections so as to enable the pointer thereof to make a plurality of revolutions without exceeding the limits of the scale.

Still a further object of my invention is to provide a rotary indicator having a single scale divided up into a plurality of circular sections together with a novel means for signifying which of the sections is to be used.

With the above and other objects in view which will be apparent from the following description, the invention consists in the construction, combination and arrangement of parts hereinafter set forth and claimed with the understanding that the elements comprising my invention may be varied in construction, proportions and arrangement without departing from the spirit and scope of the appended claim.

In the drawing the figure is an elevational view of my improved indicator showing the two pointers and the dial associated therewith. In this view, the pointers are in their initial or starting positions.

A preferred embodiment of my invention will now be described.

Looking now at the figure, a large pointer I having an index wire I' is rigidly secured to the end of a shaft 2 which shaft is driven by the "seconds" hand shaft of any "stop" clock of suitable size and accuracy. By a "stop" clock, I mean that form of clock which has a clutch interposed between the "seconds" hand and its driving shaft together with a hand-reset mechanism. When the operator depresses the starting button, the clutch will be engaged and the "seconds" hand will commence to rotate until the stopping button is depressed to disengage the clutch and stop the hand. Depression of the resetting button will cause the hand to be returned to its initial position.

I have found it desirable to drive the shaft 2 in a counterclockwise direction to facilitate the reading of the dial figures and, in addition, to drive it at one-half the speed of the usual "seconds" hand so that one complete revolution of the pointer I represents the passage of two minutes time instead of one minute. This is readily accomplished by the use of a speed reduction and reversing gearing between the "seconds" shaft of the clock and the shaft 2.

A small pointer 3 is provided which is geared to rotate at one-third the speed of pointer 1. Thus, when the pointer 1 makes one-half of a revolution, the pointer 3 will make one-sixth of a revolution.

Turning now to the dial card 4 used with my device, it will be observed that there are four separate scales, 5, 6, 7 and 8, marked off around the dial with which the large pointer cooperates for indicating the pounds of fuel used per hour. The background of scales 5 and 6 is colored yellow while that of scales 7 and 8 is colored blue. The figures and index marks on scales 5 and 7 are in black while those on scales 6 and 8 are in red. A broad white band 9 separates the scales 5 and 6 from scales 7 and 8. A narrow white band 10 separates scale 5 from scale 6 while a similar band 11 separates scales 7 and 8.

At the interior of the dial are three sectors 12, 13 and 14, which cooperate with the small pointer 3 and which contain printed directions for the use of the timer scales. The background of sector 12 is colored yellow while that of sector 13 is colored blue. The background of sector 14 is left uncolored. The legend "Read red figures for 10 pound sample" in sectors 12 and 13 is printed in red letters while the legend "Read black figures for 20 pound sample" in these two sectors is printed in black letters. The sector 14 is divided into two sections 15 and 15' which bear the legends, "Use smaller sample" and "Use larger sample," respectively.

The method of using the device is as follows:

With the pointers 1 and 3 in their starting positions as shown in Figure 1, the engine on test is started on the fuel sample and, at the same time, the starting button of the clock is depressed. The simultaneous operation of the valve controlling the flow of the fuel sample to the engine and of the starting button of the clock may be accomplished in any desired manner as, for instance, by a system of electromagnets. A similar arrangement may be used for operating the stopping button and restoring the fuel valve when the sample is consumed. When the starting button of the clock is depressed, the large pointer 1 begins to rotate away from its initial position at the top of the dial in a counterclockwise direction. At the same time the small pointer 3 begins to rotate in a similar direction away from its starting position at the bottom of the dial but at only one-third the speed of the larger pointer. Thus, after the large pointer has completed 180 degrees of rotation, the small pointer will have rotated through but 60 degrees and will register with the dividing line between sectors 12 and 14. Hence, for the first 60 degrees of movement of the small pointer it will remain within the confines of the section 15' of the sector 14 which bears the legend "Take no readings. Use larger sample." This informs the operator, if the test was concluded with the pointer in this sector, that the sample used was too small for accurate results and that he should run another test with a larger sample. The timer here illustrated is for use with either a ten or a twenty pound sample of fuel. If the operator was using a ten pound sample when this occurred, he would then begin a new test using a twenty pound sample. The large pointer is disregarded in this case as there are no appropriate readings for it on the dial during this initial one-half of a revolution. During the next 360 degrees of rotation of the large pointer, the small pointer will traverse the sector 12 which directs the use of a yellow scale. If the test with a twenty pound sample is concluded with the small pointer in this sector, the position of the large pointer with respect to scale 5 is read in accordance with the directions inscribed in sector 12. Had the sample been a ten pound one, the reading would have been taken from the red figures on scale 6 instead of from the black figures on scale 5. During the next 360 degrees of rotation of the large pointer the small pointer will travel through sector 13 which is colored blue and which directs that the reading be taken from one of the blue scales, depending on the size of the sample. Should the test be concluded with the small pointer in this sector, the reading for a twenty pound sample would be taken from the black figures on scale 7, or, for a ten pound sample, from the red figures on scale 8. During the next 180 degrees of rotation of the large pointer, the small pointer will be within the boundaries of the section 15 of the sector 14 which contains directions not to take any reading but to run another test using a smaller sample in order that the test may be concluded within the confines of the timer scales.

The scales 5 to 8 are calibrated according to the following formula:

Rotation of pointer 1 in degrees=

$$\frac{3 \times 60 \times 60 \times \text{weight of sample}}{\text{Pounds per hour}}$$

Thus, substituting 20 pounds for the weight of sample and 800 for the pounds per hour in this formula, an answer of 270 degrees is obtained. Or, substituting again 20 pounds for the weight of sample and this time 480 for the pounds per hour, the result obtained is 450 degrees. In like manner, by substituting various values for the pounds per hour in the formula, the positions of the corresponding index marks may be located around the dial.

Thus it is evident that the indicator which I have disclosed herein overcomes the problems presented by the use of an ordinary stop clock and makes possible the reading of the test results directly in pounds of fuel consumed per hour. It is also evident that my device is simple and self-explanatory, thus minimizing the opportunities for error by the personnel using it. The auxiliary pointer 3 and the matching color code makes possible the rapid and positive selection of the proper scale from which to read the result.

While the timer herein illustrated is only capable of use with two sizes of samples, it is apparent that the number of sample sizes could be increased indefinitely, the only limit being the excessive size of the dial and length of the pointer.

Having thus described my invention, what I claim as new and desire to secure by Letters Patent is:

A rate of flow indicating device for use in determining the amount of fuel consumed by an internal combustion engine per unit of time, said device comprising a disk, a plurality of scales on said disk each of which is divided into an equal number of concentric circular sections, there being one such scale for each size of fuel sample available for use in the determinations, a plurality of directory sectors on said disk equally spaced about a circle in the center of said scale sections and each bearing printed matter directing which scale and which section of that scale is to be used, the number of such sectors being equal to the number of sections into which each of the scales is divided plus an additional sector directing that no readings are to be taken and that a different sized fuel sample is to be chosen, a scale pointer rotatably mounted at the center of said scale sections and adapted to move from its initial position with a predetermined, constant speed, and a second pointer mounted for rotation about the same axis as said first-mentioned pointer but extending into cooperative relationship with said directory sectors only, said second pointer being geared to said first-mentioned pointer for rotation therewith in the ratio of 1: the number of directory sectors and lying, in its initial position, in the center of the sector directing that no readings be taken whereby on the first and last half revolution made by said first-mentioned pointer, said second pointer will indicate that no readings are to be taken and that another scale should be chosen, whereas for each intermediate complete revolution of said first-mentioned pointer, said second pointer will move to a different directory sector to thereby indicate that a different section of the scale should be used.

THOMAS T. NEILL.